United States Patent Office 2,895,745
Patented July 21, 1959

2,895,745

SUSPENSION SYSTEM FOR MAINTAINING THE LEVEL OF A VEHICLE FRAME

Antoine Brueder, Paris, France, assignor to Societe Anonyme Andre Citroen, Paris, France Application June 3, 1957, Serial No. 663,059

Claims priority, application France January 21, 1955

3 Claims. (Cl. 280—124)

This invention relates to a device for maintaining at a constant height the ground clearance of an automotive vehicle irrespective of the load and the flexibility of the suspension system, in which each wheel-supporting arm of a pair of wheels is connected to the vehicle frame through the medium of a hydropneumatic shock absorber, the hydropneumatic shock absorbers of this pair of wheels being interconnected through a hydraulic distributor responsive to the height or ground clearance of a median point of the wheel axle or of an anti-roll suspension bar interconnecting these wheels.

The invention relates to specific embodiments of the device broadly defined hereinabove, whereby the hydropneumatic shock absorbers of the pair of wheels are interconnected through a distributor controlled by the vertical position of the median point of a swing-bar pivoted on two points of the axle which are symmetrical relative to the longitudinal centre line of the vehicle.

In the attached drawings forming part of this specification:

Figure 1:
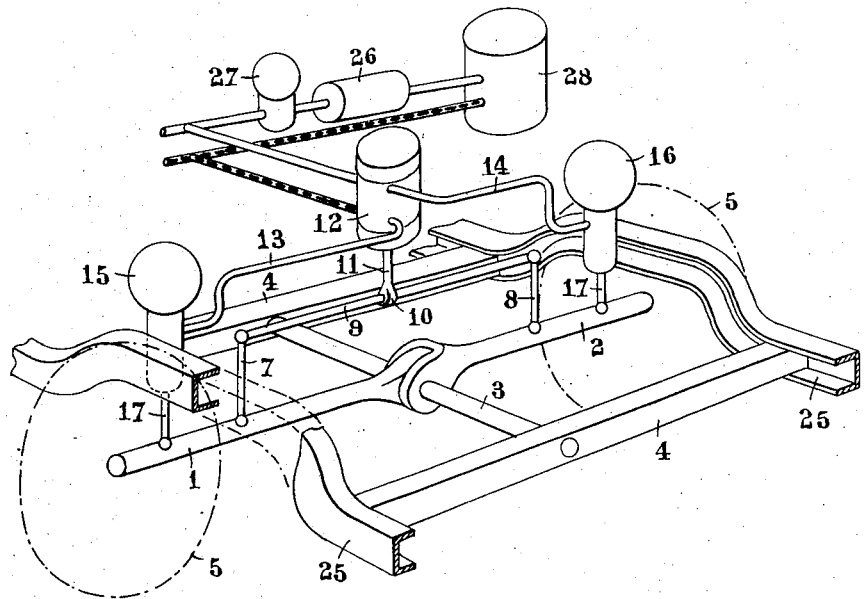
Figure 1 is a diagrammatic perspective view showing a device associated with a suspension system incorporating a hinged axle.

In the embodiment illustrated in Fig. 1, the arrangement comprises a pair of wheels 5 supported by a pair of semi-axles 1, 2 hingedly interconnected and fulcrumed on a common longitudinal shaft 3 carried by cross members 4 rigid with the frame 25 of the vehicle.

Adjacent to the wheels 5 and symmetrically to the shaft 3, the semi-axles 1, 2 have pivotally mounted thereon a pair of links 7, 8 having their upper ends pivotally connected to a transverse swing bar 9.

This swing bar 9 has pivoted thereon at its central point 10 a rod 11 controlling a hydraulic distributor 12 connected through pipe lines 13, 14 to the hydropneumatic shock absorbers 15, 16 having their piston rods 17 operatively connected in turn to the semi-axles 1, 2.

The distributor 12 is connected on the other hand to the pump 26 through the pressure accumulator 27 fed from a hydraulic fluid reservoir 28.

The distributor 12 must be so adjusted that, in an average position of the vehicle which is preferably that in which the two semi-axles 1, 2 extend at right angles to the plane of symmetry of the frame, the control rod 11 sets the distributor 12 in an inoperative position. The upward movement of this rod 11 from its intermediate position for example as a consequence of an overloading of the vehicle will cause compressed fluid to be forced into the hydropneumatic shock absorbers 15, 16, whereas a downward traction exerted by this rod 11 will cause the fluid to be returned to the reservoir.

If both wheels 5 move in relation to their intermediate position under the frame by the same vertical extent in different directions the points of the longitudinal axis of the frame which corresponds to these two wheels will remain unchanged as far as its height or level measured from the ground is concerned, and therefore no correction is required. The distributor 12 remains in its inoperative position since the two links 7, 8 and therefore their pivot connections on rod 9 move the one upwards and the other downwards through equal extents and the pivot connection 10 of control rod 11 (which is positioned at midlength of the rod 9) remains stationary.

In the general case, the movements accomplished by the two wheels 5 with respect to their respective average positions under the frame have any algebraic values. The movements of the pivot joints of the parallel links 7 and 8 on rod 9 with respect to their inherent average positions are proportional to the movements of the two wheels and the displacement of the middle point of these last-mentioned pivot joints, that is, the pivot pin 10 of the rod 11 controlling the distributor 12, is proportional to the arithmetical average of the movements of the two wheels. Thus, notably, when the load increases on both wheels, the two semi-axles 1, 2 rise under the frame 25 and lift the control rod, thus causing the fluid compressed in the hydropneumatic shock absorbers 15, 16 to be forced back and therefore the mechanical assembly to resume the mean or intermediate position in which it is illustrated in Fig. 1. When the movements of the two wheels are equal, the rod 9 effects but a simple movement of translation.

Figure 2:
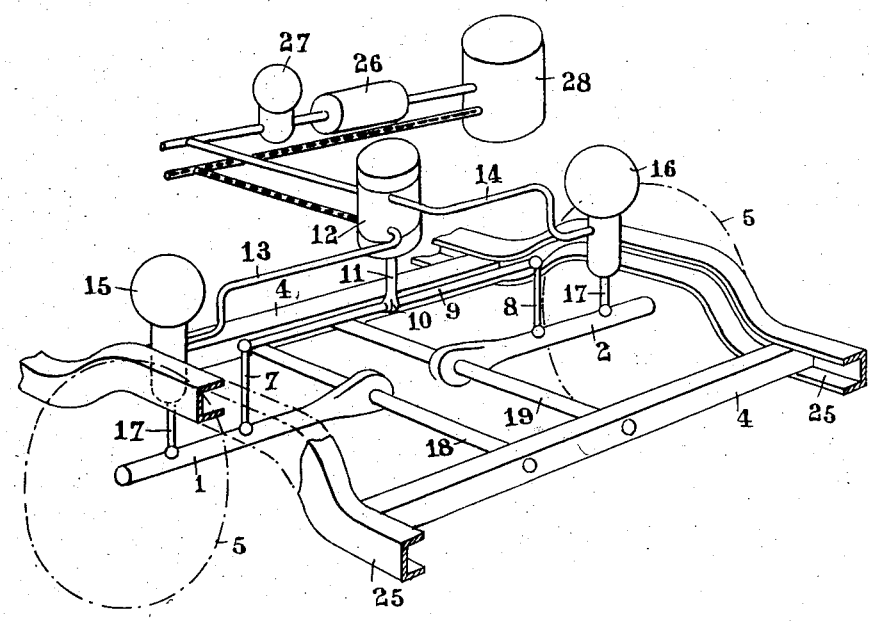
Figure 2 is a similar view showing the device mounted on a vehicle comprising two spaced semi-axles.

In Figure 2 the semi-axles 1, 2 oscillate about parallel longitudinal shafts 18, 19 rigid with the vehicle frame, the rods 7, 8 of swing bar 9 are pivoted on each semi-axle and the operation is the same as in the case of Fig. 1.

Figure 3:
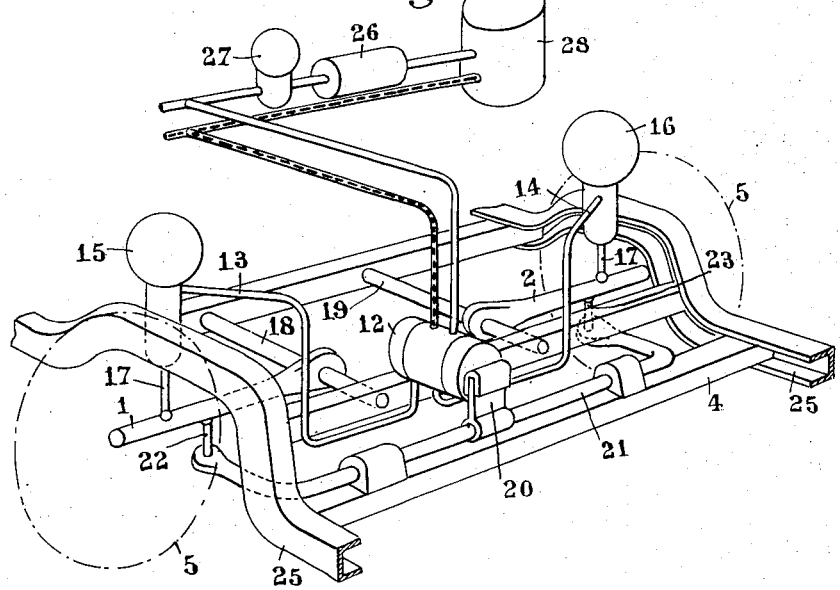
Figure 3 is a modified embodiment in the case of a vehicle also comprising a pair of spaced semi-axles.

In Fig. 3 the distributor 12 is controlled by a lug 20 solid with an anti-roll torsion bar 21 anchored on the frame and provided with bent outer extensions connected through ball-and-socket or like joints 22, 23 to the semi-axles 1, 2.

Figure 4:
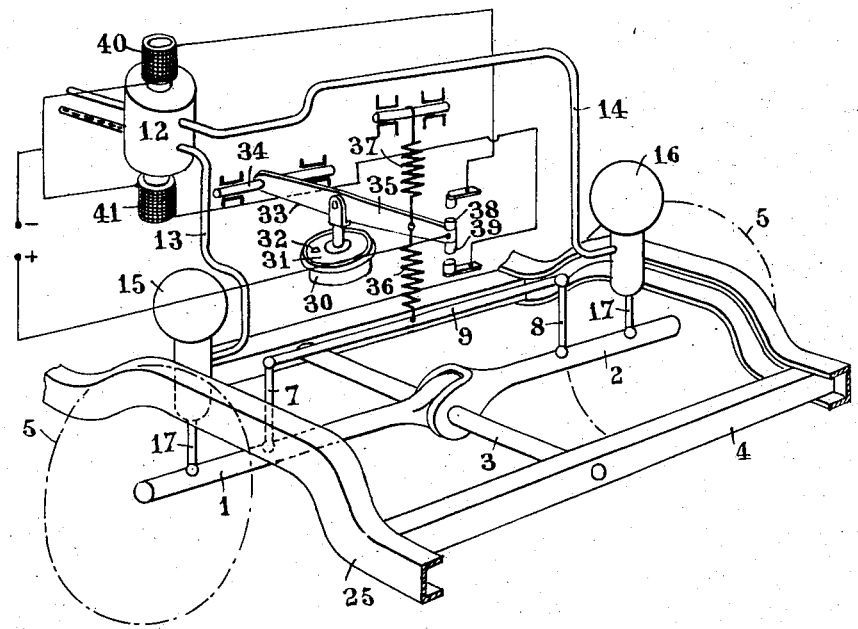
Figure 4 is a detail view showing an electrical device for controlling the distributor.

Instead of a mechanical control device, the distributor may be associated with an electrical control device as shown in Fig. 4 illustrating a suspension system of the type shown in Fig. 1.

This electrical control device comprises a swinging lever 33 having one end pivoted on a fixed point 34 of the frame and its free end 35 connected through a spring 36 to the median point of the swing bar 9 against the resistance of a return spring 37 anchored to the frame.

An air dash-pot consisting of a case 30 closed by a diaphragm 31 having an elastic outer peripheral zone and a rigid central zone with a gaged orifice 32 is provided for damping out the oscillation of the swinging lever 33.

The position of the end 35 of lever 33 in the space in relation to the vehicle frame is constantly subordinate to the height of this frame above the ground. This end 35 of the lever 33 carries a pair of electric contacts 38, 39 whereby the storage battery of the vehicle may be alternately connected to the electromagnets 40, 41 controlling the hydraulic distributor 9 so that the latter will cause hydraulic fluid under pressure to be either fed to or removed from the pair of corresponding hydropneumatic shock absorbers to maintain the ground clearance of the vehicle frame to a constant value irrespective of variations in the load and flexibility of the suspension system of the vehicle.

This application is in part a continuation of my copending application Serial No. 512,257, filed May 31, 1955 now abandoned.

What I claim is:

1. Suspension system adapted to maintain the level of the frame of a vehicle of which the wheels of each pair are mounted on swinging semi-axles, comprising for each pair of wheels two hydropneumatic shock absorbers secured on the frame and bearing on two points respectively of said semi-axles, a compressed fluid distributor mounted on said frame, members for controlling said distributor and adapted to either cause said compressed fluid to be forced into said pair of shock absorbers or release the fluid from said pair of shock absorbers, a pair of links pivoted on said semi-axles, a rod pivoted on said pair of links, and a member connecting the middle point of said rod to the distributor control member to actuate the distributor to force the compressed fluid into said shock absorbers when said middle point of said rod rises above a predetermined mean position with respect to the frame, and to release the fluid from said shock absorbers when said middle point of the rod moves beneath said predetermined mean position.

2. Suspension system adapted to maintain the level of the frame of a vehicle of which the wheels of each pair are mounted on swinging semi-axles, comprising for each pair of wheels two hydropneumatic shock absorbers secured on the frame and bearing on two points respectively of said semi-axles, a compressed-fluid distributor mounted on said frame above said semi-axles and coaxially to the intersection of the plane of symmetry of said frame with the plane of oscillation of said semi-axles, an axial rod controlling said distributor and formed with an end portion directed downwards, said control rod being adapted to actuate the distributor to force the compressed fluid into said pair of shock absorbers when said end portion rises above a predetermined average position with respect to the frame, or to actuate the distributor to release said fluid from said pair of shock absorbers when said end portion descends below said average position, a pair of links pivoted on said semi-axles respectively, a rod pivoted on said pair of links and a pivot joint connecting the middle point of said rod with the end portion of the distributor control rod.

3. Suspension system adapted to maintain the level of the frame of a vehicle of which the wheels of each pair are mounted on swinging semi-axles, comprising for each pair of wheels a pair of hydropneumatic shock absorbers secured on the frame and bearing on two points respectively of said semi-axles, a compressed fluid distributor mounted on said frame, members for actuating said distributor to force said compressed fluid into said shock absorbers and for actuating said distributor for releasing said fluid from said shock absorbers, a dashpot having a dashpot rod connected to said members, a pair of links pivoted on said semi-axles, a rod pivoted on said links, and resilient means connecting the middle point of said rod with said distributor actuating members to actuate the distributor to force the compressed fluid into said shock absorbers when said middle point of the rod rises above a predetermined mean position in relation to said frame, and to release the fluid from said shock absorbers when said middle point of the rod descends beneath said predetermined mean position.

References Cited in the file of this patent

UNITED STATES PATENTS

| | | |
|---|---|---|
| 2,653,021 | Levy | Sept. 22, 1953 |
| 2,757,376 | Brueder | July 31, 1956 |
| 2,788,982 | Allison | Apr. 16, 1957 |
| 2,843,396 | Lucien | July 15, 1958 |